US012770797B2

(12) United States Patent
Ookawa

(10) Patent No.: US 12,770,797 B2
(45) Date of Patent: Oct. 20, 2026

(54) ELECTRONIC COMPONENT AND MOUNTING STRUCTURE OF ELECTRONIC COMPONENT

(71) Applicant: Murata Manufacturing Co., Ltd., Nagaokakyo (JP)

(72) Inventor: Noriyuki Ookawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 143 days.

(21) Appl. No.: 19/014,338

(22) Filed: Jan. 9, 2025

(65) Prior Publication Data

US 2025/0149250 A1 May 8, 2025

Related U.S. Application Data

(63) Continuation of application No. PCT/JP2023/042800, filed on Nov. 29, 2023.

(30) Foreign Application Priority Data

Feb. 8, 2023 (JP) ................................ 2023-017584

(51) Int. Cl.
*H01G 4/30* (2006.01)
*H01G 4/012* (2006.01)
*H01G 4/232* (2006.01)

(52) U.S. Cl.
CPC ............... *H01G 4/30* (2013.01); *H01G 4/012* (2013.01); *H01G 4/232* (2013.01)

(58) Field of Classification Search
CPC ........... H01G 4/30; H01G 4/012; H01G 4/232
See application file for complete search history.

(56) References Cited

U.S. PATENT DOCUMENTS

2014/0192453 A1* 7/2014 Hong ....................... H01G 4/12 156/89.18
2014/0233147 A1* 8/2014 Hong ..................... H01G 4/008 361/301.4

(Continued)

FOREIGN PATENT DOCUMENTS

JP 2014-039000 A 2/2014
JP 2014-135463 A 7/2014

(Continued)

OTHER PUBLICATIONS

International Search Report and Written Opinion mailed on Jan. 23, 2024, received for International Application No. PCT/JP2023/042800, filed on Nov. 29, 2023, 11 pages including English Translation.

*Primary Examiner* — Michael P Mcfadden
(74) *Attorney, Agent, or Firm* — XSENSUS LLP

(57) ABSTRACT

An electronic component includes a base body, a first internal electrode, and a first external electrode. The first internal electrode is located inside the base body. The first external electrode covers a part of the outer surface of the base body. The first external electrode includes a first electrode covering a part of the outer surface of the base body and connected to the first internal electrode, and a second electrode covering the outer surface of the first electrode. The second electrode has spherical copper particles and silicon. An average size of the spherical copper particles is different in a first part of the second electrode than in a second part of the spherical electrode.

20 Claims, 5 Drawing Sheets

(56) References Cited

U.S. PATENT DOCUMENTS

| | | | | |
|---|---|---|---|---|
| 2021/0020370 | A1* | 1/2021 | Yoshino | H01G 4/2325 |
| 2021/0202152 | A1* | 7/2021 | Wakabayashi | H01F 1/26 |
| 2022/0208463 | A1* | 6/2022 | Hoshino | H01F 27/29 |

FOREIGN PATENT DOCUMENTS

| | | | |
|---|---|---|---|
| JP | 2015-026840 | A | 2/2015 |
| JP | 2020-155719 | A | 9/2020 |
| JP | 2021-174956 | A | 11/2021 |

* cited by examiner

ELECTRONIC COMPONENT AND MOUNTING STRUCTURE OF ELECTRONIC COMPONENT

CROSS-REFERENCE TO RELATED APPLICATIONS

This application is a continuation of international application no. PCT/JP2023/042800, filed Nov. 29, 2023, and which claims priority to Japanese application no. 2023-017584, filed Feb. 8, 2023. The entire contents of both prior applications are hereby incorporated by reference.

TECHNICAL FIELD

The present disclosure relates to an electronic component and a mounting structure of the electronic component.

BACKGROUND ART

Conventional electronic components may include a base body, an internal electrode, a dummy internal electrode, and an external electrode. The internal electrode and the dummy internal electrode are located inside the base body. The external electrode covers a part of the outer surface of the base body. The external electrode is connected to the internal electrode.

SUMMARY

Technical Problem

A mechanical impact acts on the electronic component described above from the outside, or thermal stress acts on the electronic component due to a temperature change. Accordingly, a crack and the like may occur in the base body of the electronic component. In the electronic component described above, occurrence of a crack in the base body is suppressed by a structure inside the base body such as a dummy internal electrode. On the other hand, the relationship between the external electrode and a crack, a chip, and the like of the base body has not been studied at all.

Means for Solving the Problem

In order to solve the above problems and other problems afflicting conventional electronic components, which are not mentioned here for the sake of brevity, one aspect of the present disclosure is an electronic component including a base body, an internal electrode located inside the base body, and an external electrode covering a part of an outer surface of the base body. The external electrode includes a first electrode covering a part of an outer surface of the base body and connected to the internal electrode, and a second electrode covering an outer surface of the first electrode. The second electrode includes spherical copper particles and silicon, and an average size of the spherical copper particles is different in a first part of the second electrode than in a second part of the spherical electrode.

Another aspect of the present disclosure is an electronic component mounting structure including a board, and an electronic component mounted on the board. The electronic component includes a base body. The electronic component also includes an internal electrode located inside the base body, and an external electrode covering a part of an outer surface of the base body. The external electrode includes a first electrode covering a part of an outer surface of the base body and connected to the internal electrode, and a second electrode covering an outer surface of the first electrode. The second electrode includes spherical copper particles and silicon. When a surface, of the outer surface of the base body, facing the board is a mounting surface, the first electrode covers at least a part of the mounting surface, and the second electrode covers at least an outer surface of a portion, of the outer surface of the first electrode, covering the mounting surface. An average size of the spherical copper particles is different in a first part of the second electrode than in a second part of the spherical electrode.

According to the configuration mentioned above, the second electrode has a structure in which spherical copper particles are dispersed in silicon. For this reason, the deflection strength of the second electrode is relatively small. Therefore, when an external force such as an impact and thermal stress acts on the electronic component, a deformation, a crack, and the like are likely to occur in the second electrode earlier than the base body. That is, the second electrode plays a role of alleviating the influence of the external force due to its own breakage. Therefore, when an external force acts on the electronic component, a crack and the like are less likely to occur in the base body. In a case where the second electrode is broken, the internal electrode is still connected to the first electrode. Therefore, conductivity between the internal electrode and the external electrode is secured.

Advantageous Effects

The external electrode can suppress a crack and the like of the base body.

DETAILED DESCRIPTION

Figure 1:
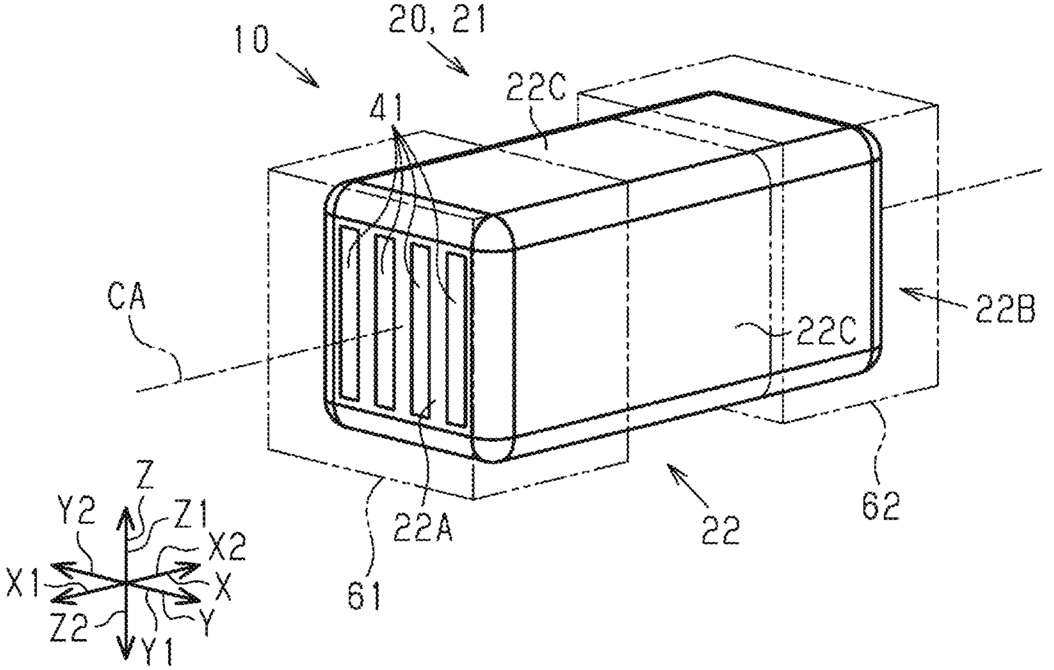
FIG. 1 is a perspective view of an electronic component.

Hereinafter, an exemplary embodiment of an electronic component and a mounting structure of the electronic component will be described with reference to the drawings. In the drawings, sometimes a component is illustrated while enlarged for the sake of easy understanding. In some cases, the dimension ratio of a component differs from an actual dimension ratio or a dimension ratio in another drawing.

<Overall Configuration of Electronic Component>

As illustrated in FIG. 1, the electronic component 10 is a multilayer ceramic capacitor. The electronic component 10 includes a base body 20. The base body 20 has a substantially quadrangular prism shape and has a central axis CA. Hereinafter, an axis extending along the central axis CA is referred to as a first axis X. One of the axes orthogonal to the first axis X is defined as a second axis Y. Further, an axis that is orthogonal to both the first axis X and the second axis Y is defined as a third axis Z. In addition, one of the directions along the first axis X is defined as a first positive direction X1, and the direction opposite to the first positive direction X1, of the directions along the first axis X, is defined as a first negative direction X2. In addition, one of the directions along the second axis Y is defined as a second positive direction Y1, and the direction opposite to the second positive direction Y1, of the directions along the second axis Y, is defined as a second negative direction Y2. Further, one of the directions along the third axis Z is defined as a third positive direction Z1, and a direction opposite to the third positive direction Z1, of the directions along the third axis Z, is defined as a third negative direction Z2.

An outer surface 21 of the base body 20 has six planes 22. The term "surface" of the base body 20 as used herein refers to a part that can be observed as a surface when the entire base body 20 is observed. More specifically, for example, when there are such minute irregularities or steps that fail to be found unless a part of the base body 20 is enlarged and then observed with a microscope or the like, the surface is expressed as a plane or a curved surface. The six planes 22 face different directions. The six planes 22 are roughly divided into a first end surface 22A that faces in the first positive direction X1, a second end surface 22B that has in the first negative direction X2, and four side surfaces 22C. The four side surfaces 22C are a surface facing the third positive direction Z1, a surface facing the third negative direction Z2, a surface facing the second positive direction Y1, and a surface facing the second negative direction Y2, respectively.

In the outer surface 21 of the base body 20, a boundary portion between two adjacent planes 22 and a boundary portion between three adjacent planes 22 are curved surfaces. That is, corners of the base body 20 are so-called round chamfered.

Figure 2:
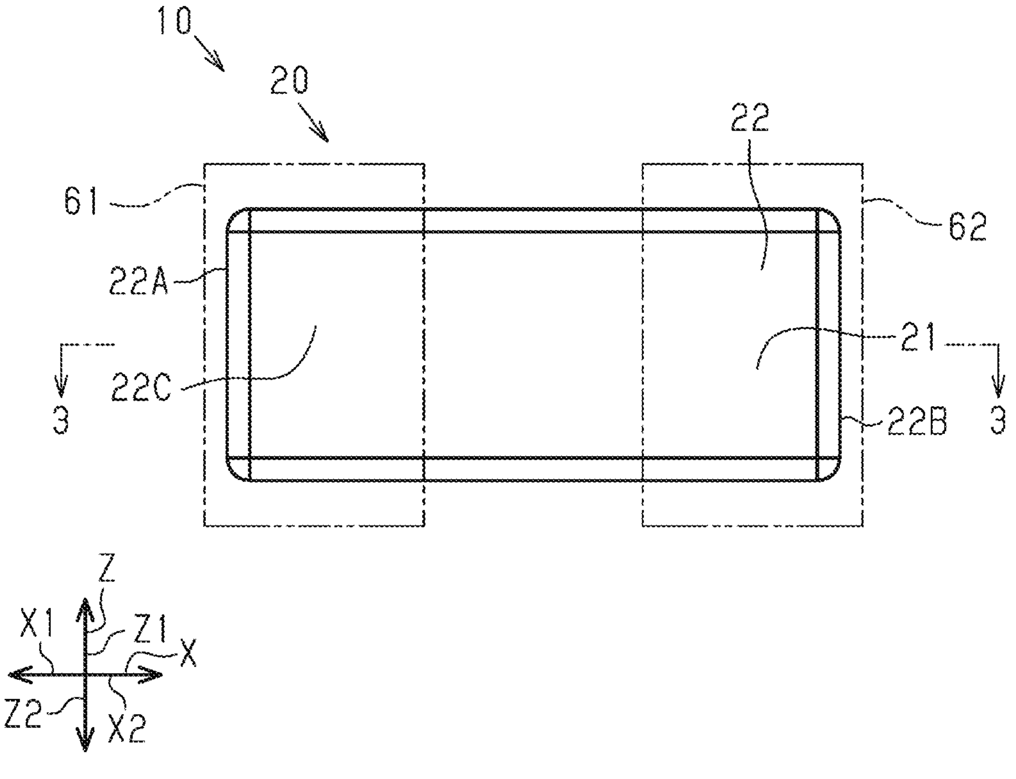
FIG. 2 is a side view of the electronic component.

As illustrated in FIG. 2, the base body 20 has a dimension in the direction along the first axis X larger than a dimension in the direction along the third axis Z. The material of the base body 20 is a dielectric ceramic. Specifically, the material of the base body 20 contains $BaTiO_3$ as a main component. Alternatively, the material of the base body 20 may contain $CaTiO_3$, $SrTiO_3$, $CaZrO_3$, or the like as a main component. In addition, the material of the base body 20 may contain a Mn compound, a Co compound, a Si compound, a rare earth compound, or the like as an accessory component.

Figure 3:
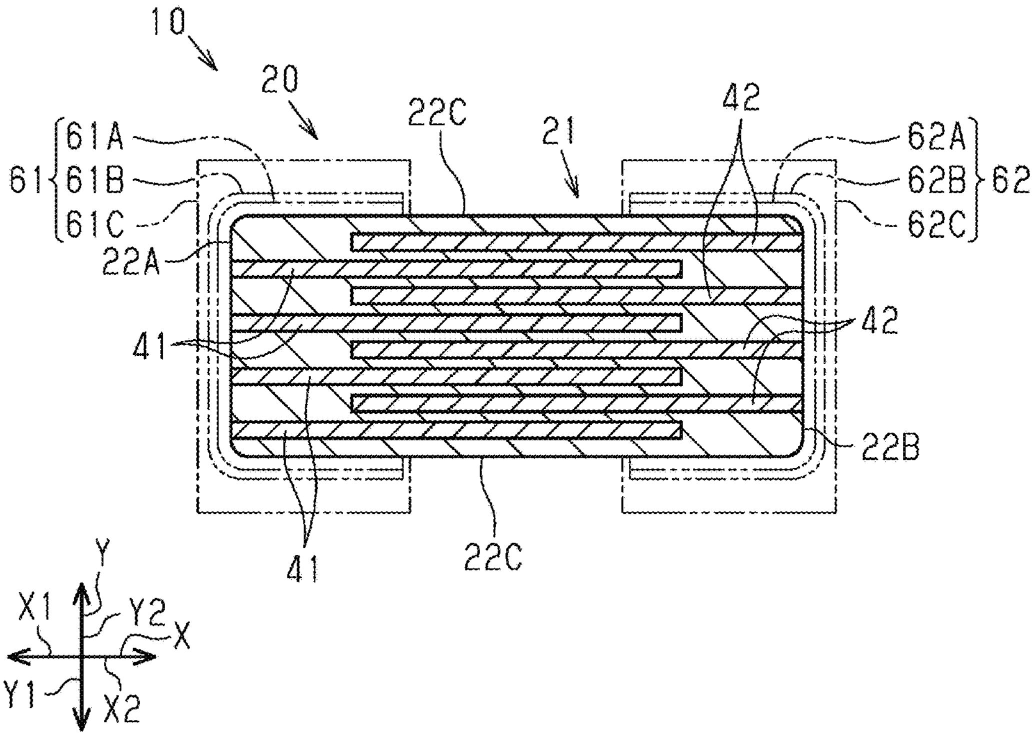
FIG. 3 is a sectional view taken along line 3-3 in FIG. 2.

As shown in FIG. 3, the electronic component 10 includes four first internal electrodes 41 and four second internal electrodes 42 as wiring. The first internal electrodes 41 and the second internal electrodes 42 are embedded in the base body 20.

The material of the first internal electrode 41 is a conductive material. For example, the material of the first internal electrodes 41 is Ni. In addition, the material of the first internal electrode 41 may further contain metals such as Ni, Cu, Ag, Au, Pt, Sn, and Pd, or alloys containing these metals. The material of the second internal electrodes 42 is the same as the material of the first internal electrodes 41.

The first internal electrode 41 has a rectangular plate shape. The first internal electrode 41 has a principal surface orthogonal to the second axis Y. The second internal electrode 42 has the same rectangular plate shape as the first internal electrode 41. The second internal electrode 42 has a principal surface orthogonal to the second axis Y, as with the first internal electrode 41.

The dimension of the first internal electrode 41 in the direction along the first axis X is smaller than the dimension of the base body 20 in the direction along the first axis X. As illustrated in FIG. 1, the dimension of the first internal electrode 41 in the direction along the third axis Z is approximately ⅔ of the dimension of the base body 20 in the direction along the third axis Z. The dimension of the second internal electrode 42 in each of the directions is the same as that of the first internal electrode 41.

As illustrated in FIG. 3, the first internal electrodes 41 and the second internal electrodes 42 are located in a staggered manner in the direction along the second axis Y. More specifically, a total of eight internal electrodes are arranged alternately in the order of the first internal electrode 41 and the second internal electrode 42 toward the second negative direction Y2 from the side surface 22C that faces in the second positive direction Y1. According to the exemplary embodiment, each of the internal electrodes has an equal distance therebetween in the direction along the second axis Y.

As illustrated in FIG. 1, the four first internal electrodes 41 and the four second internal electrodes 42 are both located at the center of the base body 20 in the direction along the third axis Z. On the other hand, as illustrated in FIG. 3, the first internal electrodes 41 are located deviated to the first positive direction X1. The second internal electrodes 42 are located deviated to the first negative direction X2.

Specifically, an end of the first internal electrode 41 on the first positive direction X1 side substantially coincides with an end of the base body 20 on the first positive direction X1 side. Therefore, the end of the first internal electrode 41 on the first positive direction X1 side is exposed from the first end surface 22A of the base body 20. The end of the first internal electrode 41 on the first negative direction X2 side is located inside the base body 20 and does not reach the end of the base body 20 on the first negative direction X2 side. On the other hand, an end of the second internal electrode 42 on the first negative direction X2 side substantially coincides with an end of the base body 20 on the first negative direction X2 side. Therefore, the end of the second internal electrode 42 on the first negative direction X2 side is exposed from the second end surface 22B of the base body 20. The end of the second internal electrode 42 on the first positive direction X1 side is located inside the base body 20 and does not reach the end of the base body 20 on the first positive direction X1 side.

As illustrated in FIG. 3, the electronic component 10 includes a first external electrode 61 and a second external electrode 62. The first external electrode 61 includes a first electrode 61A, a second electrode 61B, and a third electrode 61C.

The first electrode 61A covers a part of the outer surface 21 of the base body 20. Specifically, the first electrode 61A covers the first end surface 22A of the base body 20 and parts of the four side surfaces 22C thereof on the first positive direction X1 side. The first electrode 61A is connected to the first internal electrode 41 exposed from the first end surface 22A. The first electrode 61A is substantially copper and contains a trace amount of glass.

The second electrode 61B covers the outer surface of the first electrode 61A. That is, the second electrode 61B is laminated on the first electrode 61A. Details of the second electrode 61B will be described later. The third electrode 61C covers the outer surface of the second electrode 61B. That is, the third electrode 61C is laminated on the second electrode 61B. A part of the third electrode 61C protrudes from the second electrode 61B. Although not illustrated in the drawing, the third electrode 61C has a two-layer structure of a nickel layer and a tin layer in this order from the second electrode 61B side.

The second external electrode 62 includes a first electrode 62A, a second electrode 62B, and a third electrode 62C.

The first electrode 62A covers a part of the outer surface 21 of the base body 20. Specifically, the first electrode 62A covers the second end surface 22B of the base body 20 and parts of the four side surfaces 22C thereof on the first negative direction X2 side. The first electrode 62A is connected to the second internal electrode 42 exposed from the second end surface 22B. The material of the first electrode 62A is the same as the material of the first electrode 62A in the first external electrode 61.

Figure 4:
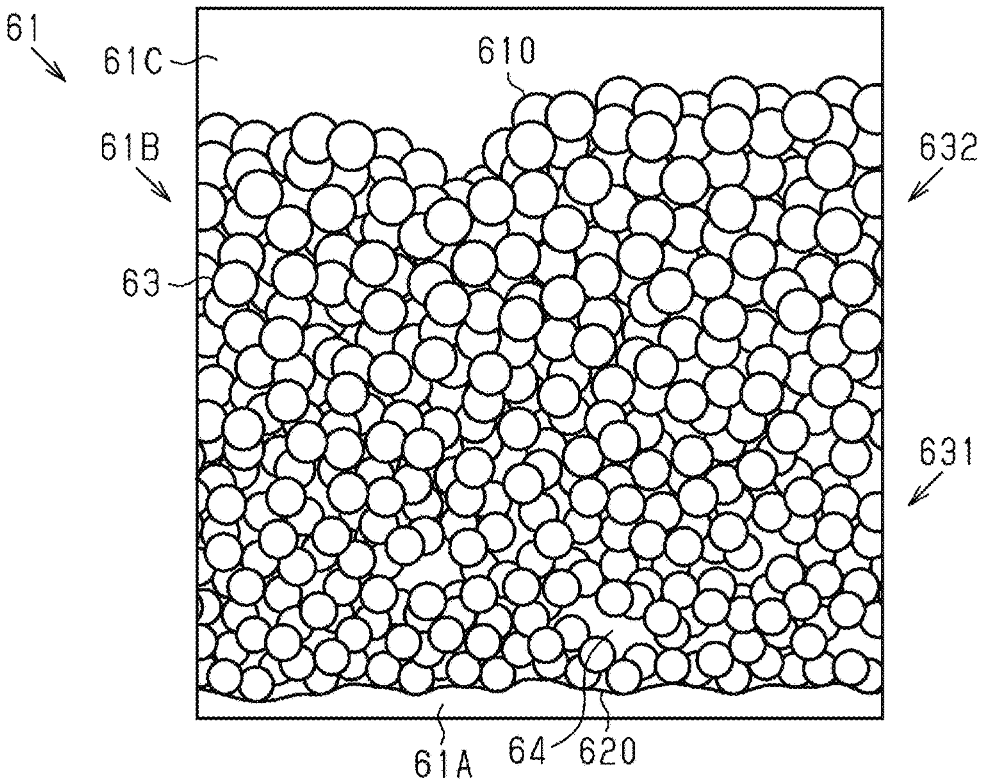
FIG. 4 is an enlarged view of a schematic section of the first external electrode of the electronic component.

As illustrated in FIG. 3, the second electrode 62B covers the outer surface of the first electrode 62A. Therefore, the second electrode 62B is laminated on the first electrode 62A. Details of the second electrode 62B will be described later. As illustrated in FIGS. 3 and 4, the third electrode 62C covers the outer surface 610 of the second electrode 62B. Therefore, the third electrode 62C is laminated on the second electrode 62B. As illustrated in FIG. 3, a part of the third electrode 62C protrudes from the second electrode 62B. Although not illustrated in the drawing, the third electrode 62C has a two-layer structure of a nickel layer and a tin layer in this order from the second electrode 62B side.

The second external electrode 62 does not reach the first external electrode 61 on the side surface 22C, and is disposed away from the first external electrode 61 in the direction along the first axis X. On the side surface 22C of the base body 20, the first external electrode 61 and the second external electrode 62 are not stacked in a central portion in the direction along the first axis X. In FIGS. 1 to 3, the first external electrode 61 and the second external electrode 62 are indicated by two-dot chain lines.

<Configuration of Second Electrode>

Hereinafter, the configuration of the second electrode 61B of the first external electrode 61 will be described in detail. The configuration of the second electrode 62B of the second external electrode 62 is also similar to that of the first external electrode 61.

The second electrode 61B has copper and silicon. The second electrode 61B is a sintered body. The ratio by weight of copper to silicon in the second electrode 61B is 0.5 or more and 2 or less. As illustrated in FIG. 4, at least a part of copper in the second electrode 61B has spherical copper particles 63. In addition, silicon in the second electrode 61B is present as a silicone resin 64. It is to be noted that the silicone resin 64 is a polymer composed of a siloxane bond and a Si—C bond.

As illustrated in FIG. 4, the second electrode 61B is herein bisected into a first part 631 located on the inner surface 620 side of the second electrode 61B and a second part 632 located on the outer surface 610 side of the second electrode 61B. The inner surface 620 of the second electrode 61B is a boundary surface of the second electrode 61B on a side close to the first electrode 61A. The outer surface 610 of the second electrode 61B is a surface of the second electrode 61B opposite to the first electrode 61A. The position where the second electrode 61B is bisected is a position where the average value of the thicknesses of the second electrode 61B described later is bisected.

As illustrated in FIG. 4, the average value of the particle sizes of the copper particles 63 is different between the first part 631 and the second part 632. Specifically, the average value of the particle sizes of the copper particles 63 in the first part 631 is smaller than the average value of the particle sizes of the copper particles 63 in the second part 632. More specifically, the particle sizes of most of the copper particles 63 located in the first part 631 are smaller than the particle sizes of the copper particles 63 located in the second part 632. Further, as a whole, the particle sizes of the copper particles 63 are decreased toward the inner surface 620 in the second electrode 61B.

The particle size of the copper particles 63 is calculated as follows. First, the contours of the copper particles 63 are acquired by image processing with an electron microscope. The acquired image is analyzed, and a line segment connecting one edge and the other edge of one copper particle 63 is defined as a long diameter. In addition, a line segment orthogonal to the long diameter and connecting one edge and the other edge of the copper particle 63 is defined as a short diameter. The particle size of one copper particle 63 is calculated as the average of the long diameter and the short diameter.

Figure 5:
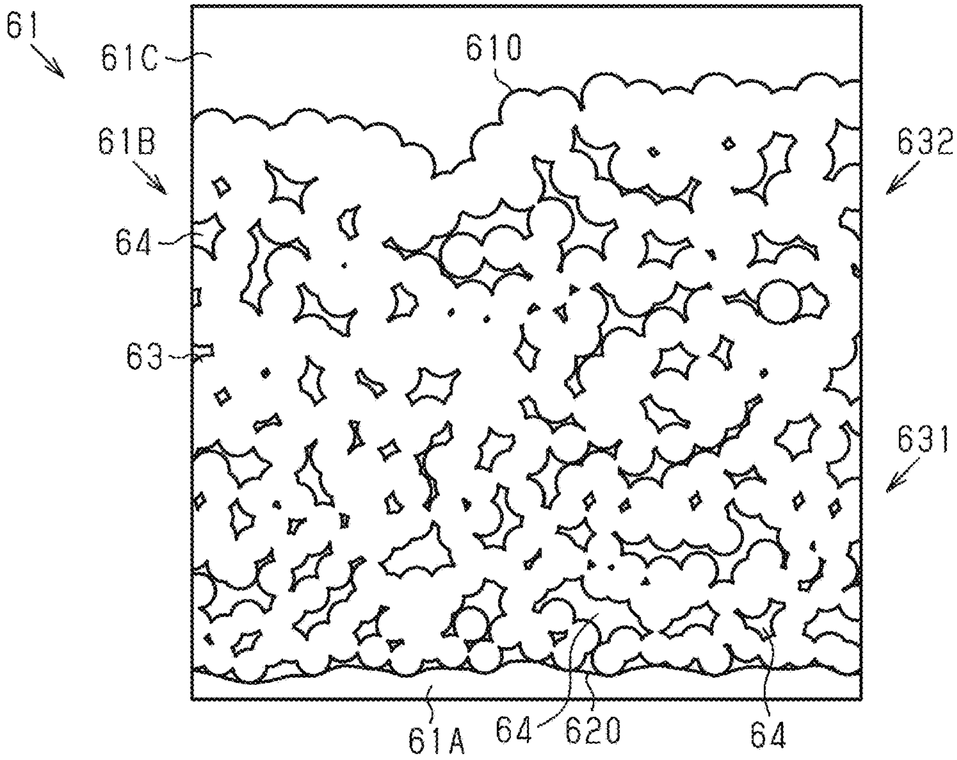
FIG. 5 is an enlarged view of a schematic section of the first external electrode of the electronic component.

As illustrated in FIG. 5, the silicone resin 64 serving as silicon is distributed in a network form. Specifically, when the second electrode 61B is viewed in section, the silicone resin 64 is distributed in a mesh shape so as to fill the space between the plurality of copper particles 63. In addition, a part of the silicone resin 64 has a lump form. The silicone resin 64 in the lump form is a condensed part of the silicone resin 64 in the network form. In particular, the first part 631 is higher than the second part 632 in the proportion of the silicone resin 64 in the lump form.

The proportion of the silicone resin 64 in the first part 631 of the second electrode 61B is higher than the proportion of the silicone resin 64 in the second part 632 of the second electrode 61B. That is, the proportion of silicon in the first part 631 is higher than the proportion of silicon in the second part 632. It is to be noted that the proportion of the silicone resin 64 is calculated as follows. First, a section of the second electrode 61B is photographed with an electron microscope. Next, for the photographed image, the area occupied by the silicone resin 64 within a certain square range is calculated. Then, the area of the silicone resin 64 with respect to the area of the square is defined as the proportion of the silicone resin 64. In this case, the square range is determined so as not to protrude from the first part 631, and the proportion of the silicone resin 64 is calculated. Then, the proportion of the silicone resin 64 is calculated at three or more points within the range of the first part 631, and the average value thereof is defined as the proportion of the silicone resin 64 in the first part 631. It is to be toted that the same applies to the second part 632.

The shortest distance from the surface of the first electrode 61A on the base body 20 side to the outer surface of the first electrode 61A is defined as the thickness of the first electrode 61A. In addition, the shortest distance from the inner surface 620 to the outer surface 610 of the second electrode 61B is defined as the thickness of the second electrode 61B. The average value of the thicknesses of the second electrodes 61B is smaller than the average value of the thicknesses of the first electrodes 61A.

The average value of the thicknesses of the respective electrodes is calculated as follows. First, a section including the outer surface 610 and the inner surface 620 of the second electrode 61B is photographed with an electron microscope. Next, a range in a direction along the outer surface 610 of the second electrode 61B is specified for the photographed image. In this range, the sectional area of the second electrode 61B is calculated by image processing for a measurement range of at least 5 μm or more. Then, the calculated sectional area of the second electrode 61B in the measurement range is divided by the length, which is the measurement range, to calculate the thickness of the second electrode 61B. More specifically, the thickness of the second electrode 61B is the thickness in the measurement range. The thickness of the second electrode 61B is measured at 5 sections by such a method, and the average value of the thicknesses is calculated.

Similarly, the thickness of the first electrode 61A is calculated. That is, a section including the surface of the first electrode 61A on the base body 20 side and the outer surface of the first electrode 61A is photographed with an electron microscope. Next, a range in a direction along the outer surface of the first electrode 61A is specified for the photographed image. In this range, the sectional area of the first electrode 61A is calculated by image processing for a measurement range of at least 5 μm or more. Then, the calculated sectional area of the first electrode 61A in the measurement range is divided by the length, which is the measurement range, to calculate the thickness of the first electrode 61A. More specifically, the thickness of the first electrode 61A is the thickness in the measurement range. The thickness of the first electrode 61A is measured at 5 sections by such a method, and the average value of the thicknesses is calculated.

<Method of Manufacturing Electronic Component>

Next, the method for manufacturing the electronic component 10 will be described.

Figure 6:
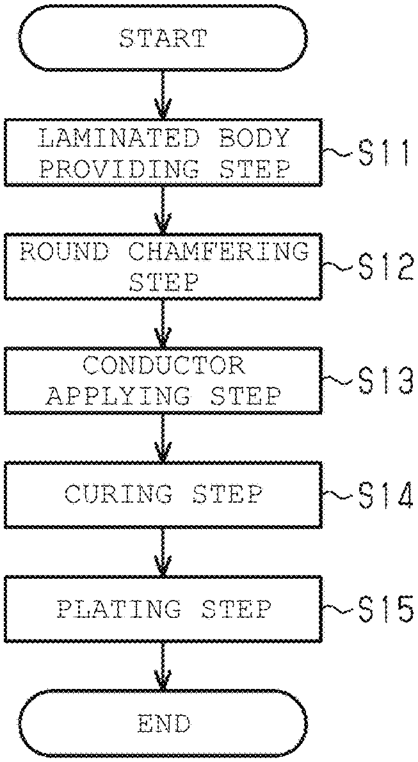
FIG. 6 is a flowchart to outline a method of manufacturing an electronic component.

As illustrated in FIG. 6, the method for manufacturing the electronic component 10 includes a laminated body providing step S11, a round chamfering step S12, a conductor applying step S13, a curing step S14, and a plating step S15.

First, in forming the base body 20, a laminate body is prepared in the laminated body providing step S11. The laminate body at this stage is in a state before round chamfering, and has a rectangular parallelepiped shape having the six planes 22. For example, first, a plurality of ceramic sheets to be the base body 20 are provided. Each of the sheets has a thin plate shape. A conductive paste to be the first internal electrode 41 is laminated on the sheet. A ceramic sheet to be the base body 20 is laminated on the paste. A conductive paste to be the second internal electrode 42 is laminated on the sheet. In this manner, the ceramic sheet and the conductive paste are laminated. Then, the laminated sheets are subjected to pressure bonding in the stacking direction by means such as die pressing. Thereafter, the sheets subjected to the pressure bonding are cut into a predetermined size to form an unfired laminated body. Thereafter, the unfired laminated body is fired at a high temperature to provide a laminated body.

Next, the round chamfering step S12 is performed. In the round chamfering step S12, the laminate body provided in the laminated body providing step S11 is round chamfered. By this step, the base body 20 in which the corner portion is round chamfered is obtained.

Next, the conductor applying step S13 is performed. In the conductor applying step S13, the first conductor paste is applied to a part of the first end surface 22A of the base body 20 and a part of the second end surface 22B of the base body 20 by an immersion method. Specifically, the first conductor paste is applied so as to cover the entire region of the first end surface 22A and parts of the four side surfaces 22C. In addition, the first conductor paste is applied so as to cover the entire region of the second end surface 22B and parts of the four side surfaces 22C. The first conductor paste contains a copper component and a silicon component.

Further, in the conductor applying step S13, the second conductor paste is applied onto the first conductor paste at two positions. The second conductor paste is a complex ink. The second conductor paste is prepared as follows. First, an amine compound such as 2-ethylhexylamine and an alcoholamine such as 2-amino-2-methylpropanol are mixed. Then, a silicon component such as a silicone resin is added thereto in an amount of 10-300 wt % with respect to the weight of Cu alone. Then, a metal salt is further added thereto and dissolved to prepare the second conductor paste. More specifically, the second conductor paste contains a copper component and the silicon component. The sintering onset temperature of the copper component is 170 degrees, and the curing onset temperature of the silicon component is 250 degrees.

Next, the curing step S14 is performed. Specifically, in the curing step S14, the base body 20 with the first conductor paste and the second conductor paste applied thereto is heated. According to the present exemplary embodiment, the base body 20 with the first conductor paste and the second conductor paste applied thereto is heated in a nitrogen atmosphere. Then, the temperature is maintained within the range from 300 degrees to 600 degrees. As a result, the first conductor paste and the second conductor paste are fired. In firing the second conductor paste, first, sintering of the copper component contained in the second electrode 61B and in the second electrode 62B is started. At the time when the copper component is started to be sintered, the silicon component is not cured with fluidity. Thus, the gaps of the copper component are filled with the silicon component. Then, when the temperature is further increased to the curing onset temperature of the silicon component after the copper component is started to be sintered, the silicon component contained in the second electrode 61B and in the second electrode 62B is started to be cured. More specifically, the curing onset temperature of the silicon component is higher than the sintering onset temperature of the copper component. Then, the copper component is sintered, thereby producing the copper particles 63. In addition, the silicon component is cured, thereby producing the silicone resin 64. In addition, as described above, the curing onset temperature of the silicon component is higher than the sintering onset temperature of the copper component, thus providing the silicone resin 64 in the network form, which fills the gaps between the copper particles 63. As a result, the second electrode 61B and the second electrode 62B as described above are formed.

Next, the plating step S15 is performed. Electroplating is performed at a position where the second electrode 61B and the second electrode 62B are located. As a result, the third electrode 61C is formed on the surface of the second electrode 61B. In addition, the third electrode 62C is formed on the surface of the second electrode 62B. Although not illustrated in the in the drawing, the third electrode 61C and the third electrode 62C are electroplated with two kinds of nickel and tin to form a two-layer structure. In this way, the electronic component 10 is formed.

Actions of Present Exemplary Embodiment

The second electrode 61B has a silicone resin 64, and the copper particles 63 are dispersed in the silicone resin 64. For this reason, the deflection strength of the second electrode 61B is relatively small. Therefore, when an external force such as an impact and thermal stress acts on the electronic component 10, a deformation, a crack, and the like are likely to occur in the second electrode 61B earlier than the base body 20. That is, the second electrode 61B plays a role of alleviating the influence of the external force due to its own breakage.

Advantageous Effects of Present Exemplary Embodiment

The advantageous effects of the present exemplary embodiment will be described. Hereinafter, the effects of the first external electrode 61 will be representatively described, and the second external electrode 62 also produces the same advantageous effects.

(1) According to the exemplary embodiment mentioned above, since the second electrode 61B is provided, a crack and the like are less likely to occur in the base body 20 when an external force acts on the electronic component 10. When a crack or the like occurs in the second electrode 61B, the first internal electrode 41 is still connected to the first electrode 61A. Therefore, conductivity between the first external electrode 61 and the first internal electrode 41 is secured.

(2) The silicone resin 64 has higher adhesion to the other members than the copper particles 63. According to the exemplary embodiment mentioned above, the proportion of the silicone resin 64 in the first part 631 of the second electrode 61B is higher than the proportion of the silicone resin 64 in the second part 632 of the second electrode 61B. In other words, the silicone resin 64 is highly likely to be exposed to the inner surface 620 of the second electrode 61B. Therefore, the silicone resin 64 is likely to adhere to the first electrode 61A, and the second electrode 61B is unlikely to be peeled off from the first electrode 61A. In addition, since the second electrode 61B is adhered to the first electrode 61A as described above, in a case where a crack or the like occurs in the second electrode 61B, it is possible to prevent the crack from spreading to the boundary surface between the second electrode 61B and the first electrode 61A and to prevent the entire second electrode 61B from peeling off from the first electrode 61A.

(3) According to the exemplary embodiment mentioned above, the second electrode 61B contains the silicone resin 64. As described above, when the electrode contains the silicone resin 64, the strength of the second electrode 61B can be designed to a preferable value by designing the content of the silicone resin 64 to an arbitrary value.

(4) According to the exemplary embodiment mentioned above, the average value of the thicknesses of the second electrodes 61B is smaller than the average value of the thicknesses of the first electrodes 61A. According to this configuration, the thickness of the entire first external electrode 61 can be reduced as compared with the case where the average value of the thicknesses of the second electrodes 61B is equal to the average value of the thicknesses of the first electrodes 61A. That is, the configuration mentioned above is particularly useful in a small electronic component.

(5) In the exemplary embodiment mentioned above, the third electrode 61C covering the second electrode 61B is provided. According to this configuration, when a crack or the like occurs in the second electrode 61B, the crack can still be prevented from spreading to the outer surface of the first external electrode 61, that is, the outer surface of the third electrode 61C.

(6) In the exemplary embodiment mentioned above, the first electrode 61A and the second electrode 61B are formed by an immersion method. In a case where the first external electrode 61 is formed of a plurality of layers, it is still possible to suppress deterioration of mass productivity by adopting this method.

Modification Examples

The exemplary embodiment mentioned above and the following modification examples can be implemented in combination within a range that is not technically contradictory. In the case of a modification that can be commonly applied to the first external electrode 61 and the second external electrode 62, a modification related to the first external electrode 61 will be representatively described.

In the exemplary embodiment mentioned above, the electronic component 10 is not limited to any multilayer ceramic capacitor. For example, the electronic component 10 may be a piezoelectric component, a thermistor, an inductor, and the like including the base body 20, the first external electrode 61, and the second external electrode 62.

In the exemplary embodiment mentioned above, the material of the base body 20 may be a dielectric substance, a piezoelectric substance, a magnetic substance such as ferrite, a composite of a synthetic resin and a metal, or the like.

In the exemplary embodiment mentioned above, the second conductor paste may be nano inks. In the case of nano inks, the inks are prepared as follows. Nanometal powders are dispersed in solvents containing cellosolves, carbitols, hydrocarbons, aromatics, and the like. Then, various silicone-modified resins, or silicone resins, sol-gel-based materials, or the like are added in an amount of 10-300 wt % with respect to the weight of Cu alone. The second conductor paste of the nano inks may be prepared in this manner, or by different methods.

In the exemplary embodiment mentioned above, the materials in the case of a complex ink for the second conductor paste is not limited to the example of the exemplary embodiment mentioned above. For example, the amine compound may be any of primary amines, secondary amines, and tertiary amines, and furthermore, the number of N atoms is not limited. For example, the amine compound may be a primary amine such as an octylamine or a hexylamine, a secondary amine such as a di-n-butylamine, or a tertiary amine such as an N,N-dimethylhexylamine. In addition, the amine compound may be an alcoholamine, a diamine, or the like, and the positional relationship between the N atom and the OH group is not specified at the α-, β-, γ-position, or the like. Furthermore, the numbers of N and O atoms in one molecule are also not particularly limited. For example, the amine compound may be an α-hydroxylamine such as 2-dimethylaminoethanol or 2-ethylaminoethanol, or a β-hydroxylamine such as 3-amino-1-propanol or 4-amino-2-butanol. Furthermore, the amine compound may be a diamine such as an ethylenediamine, or a cyclic diamine such as piperazine. In addition, the silicon component may be, for example, various silicone-modified resins such as epoxy resins, polyester resins, and phenol resins, sol-gel materials, and the like. In addition, as the metal salt, metal salts obtained from formic acids, acetic acids, oxalic acids, other organic acids, and the like may be adopted. Examples of this type of metal salt include a copper formate anhydride.

In the exemplary embodiment mentioned above, the numbers of the first internal electrodes 41 and the second internal electrodes 42 are not limited to the example of the exemplary embodiment mentioned above. The number of the first internal electrodes 41 may be less than or more than 4. In this respect, the same applies to the second internal electrodes 42.

In the exemplary embodiment mentioned above, the electronic component 10 may include a glass film. In such a case, for example, the glass film may be formed so as to cover the region of a part of the outer surface 21 of the base body 20. More specifically, the electrical connection between the first internal electrodes 41 and the first external electrode 61 and the electrical connection between the second internal electrodes 42 and the second external electrode 62 have only to be secured, if there is any glass film covering the base body 20.

In the exemplary embodiment mentioned above, the material of the first electrode 61A is not limited to the example of the exemplary embodiment mentioned above. For example, the material of the first electrode 61A may be a metal such as Ni, Ag, or Cu, or may include any of these metals.

In the exemplary embodiment mentioned above, the second electrode 61B may cover at least a part of the first electrode 61A. Here, the second electrode 61B preferably covers at least a surface facing the board 100 in a case where the electronic component 10 is mounted on the board 100, of the outer surface of the first electrode 61A.

Figure 7:
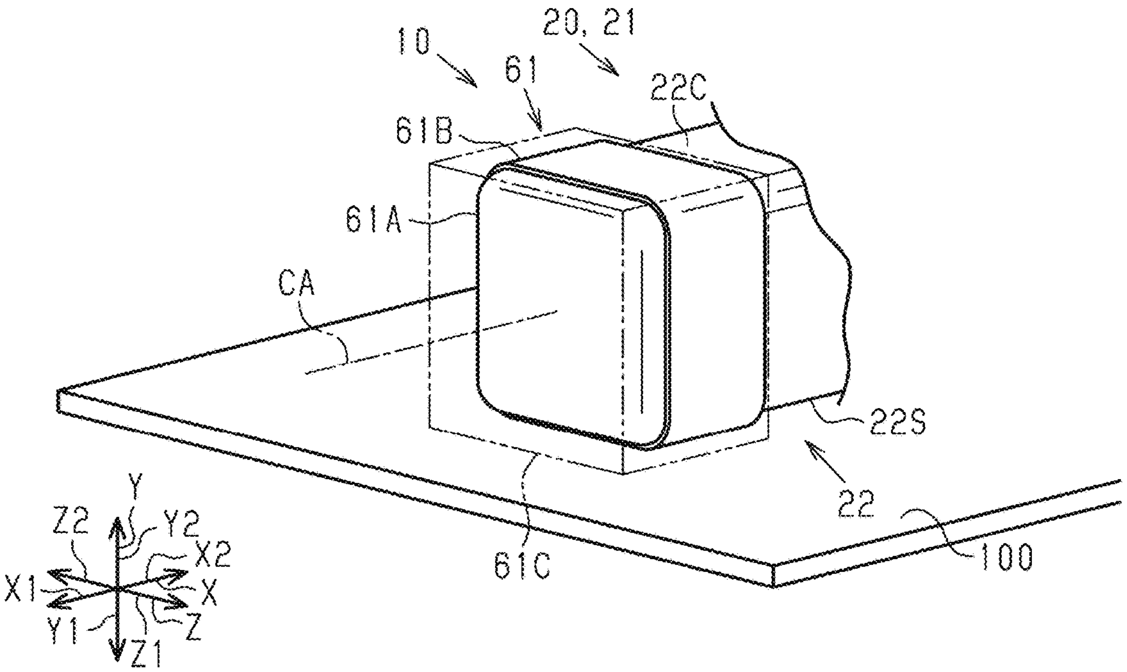
FIG. 7 is a view illustrating a mounting structure including an electronic component and a board according to a modification.
Figure 8:
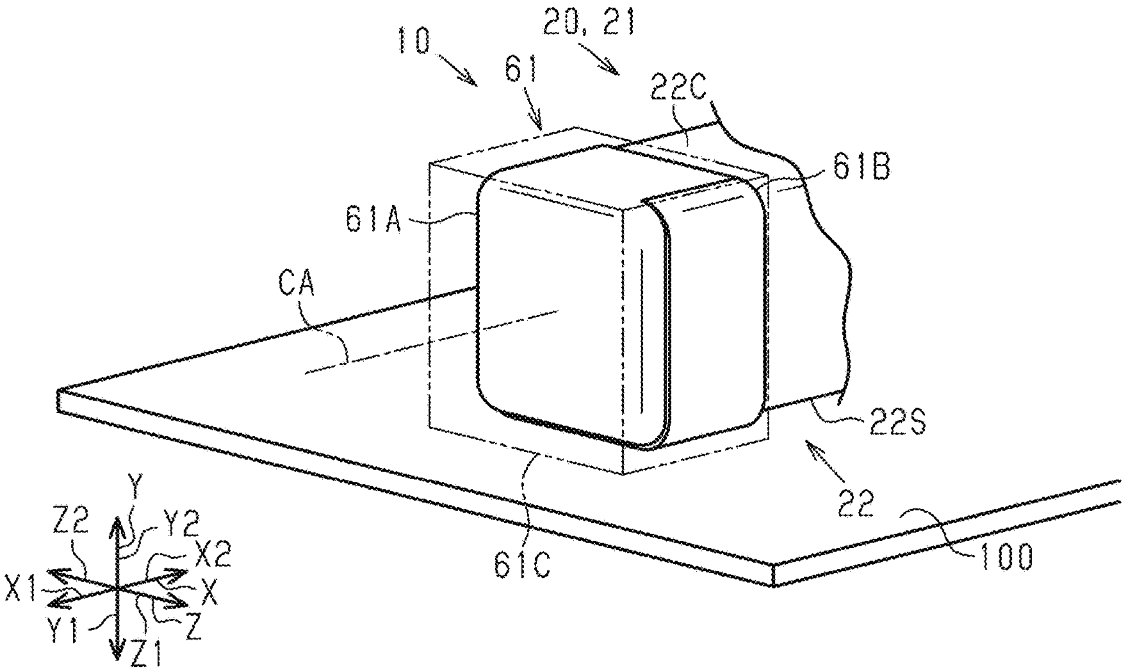
FIG. 8 is a view illustrating a mounting structure including an electronic component and a board according to a modification.
Figure 9:
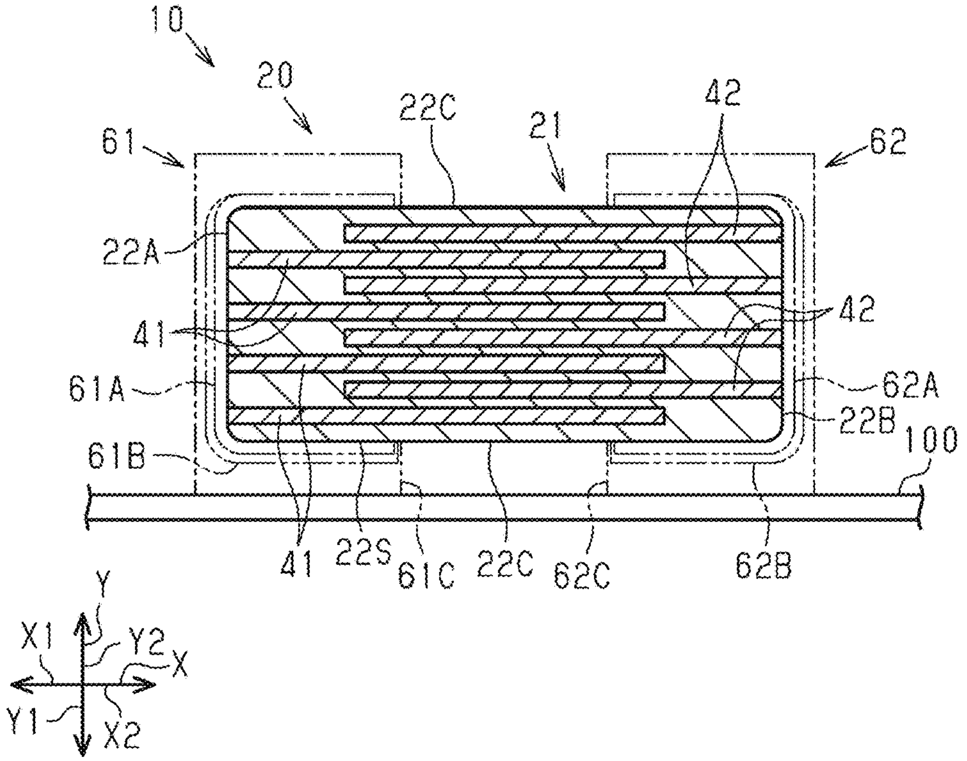
FIG. 9 is a sectional view of an electronic component and a board according to a modification.
Figure 10:
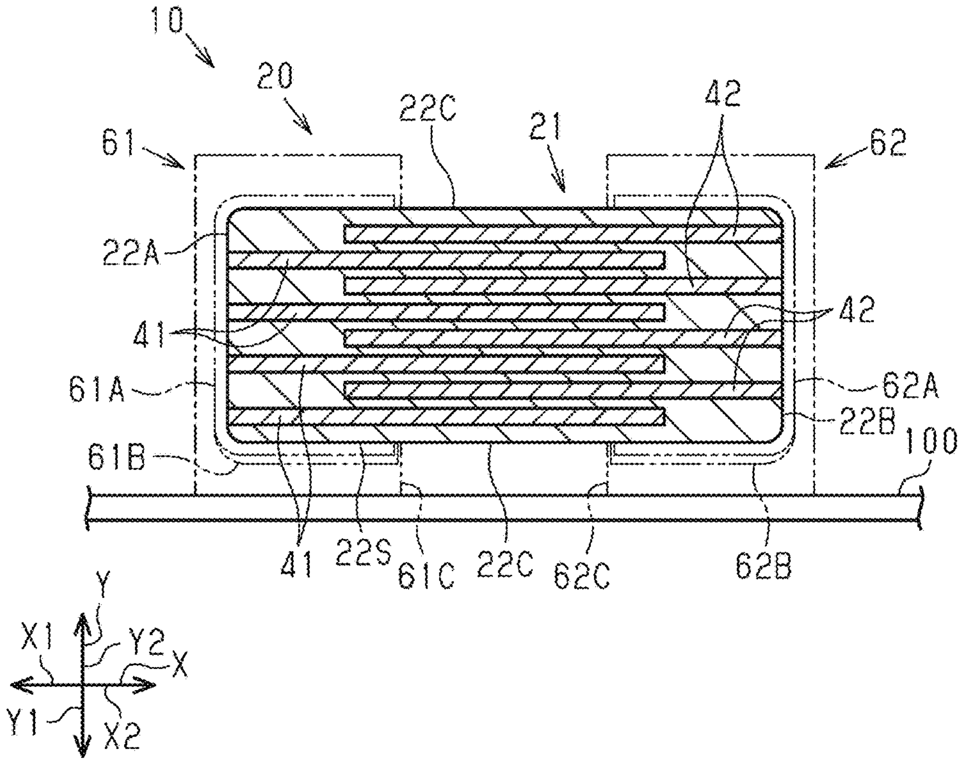
FIG. 10 is a sectional view of an electronic component and a board according to a modification.

For example, the mounting structure illustrated in FIG. 7 includes a board 100 and an electronic component 10 mounted on the board 100. Of the outer surface 21 of the base body 20, a side surface 22C facing the second positive direction Y1 is a mounting surface 22S with respect to the board 100. The first electrode 61A covers, of the outer surface 21 of the base body 20, a surface facing the first positive direction X1 and a part of the four side surfaces 22C. That is, the first electrode 61A covers a part of the mounting surface 22S. The second electrode 61B covers, of the outer surface of the first electrode 61A, a total of four surfaces, that is, a surface facing the second positive direction Y1, a surface facing the second negative direction Y2, a surface facing the third positive direction Z1, and a surface facing the third negative direction Z2. In the example illustrated in FIG. 8, the second electrode 61B covers, of the outer surface of the first electrode 61A, a total of three surfaces, that is, a surface facing the second positive direction Y1, a surface facing the third positive direction Z1, and a surface facing the third negative direction Z2. In the example illustrated in FIG. 9, the second electrode 61B covers, of the outer surface of the first electrode 61A, only a total of two surfaces, that is, a surface facing the second positive direction Y1 and a surface facing the first positive direction X1. Further, in the example illustrated in FIG. 10, the second electrode 61B covers, of the outer surface of the first electrode 61A, only the surface facing the second positive direction Y1. That is, in each of the examples illustrated in FIGS. 7 to 10, the second electrode 61B covers, of the outer surface of the first electrode 61A, the outer surface of the portion covering the mounting surface 22S. Then, according to the electronic component 10 of the example of FIGS. 7 to 10, in a case where the second electrode 61B collides with the board 100 at the time of mounting, the effect (1) of the exemplary embodiment mentioned above can be exerted to suppress the influence of the external force on the base body 20.

In the exemplary embodiment mentioned above, the proportion of the silicone resin 64 in the first part 631 of the second electrode 61B may be lower or equal to the proportion of the silicone resin 64 in the second part 632 of the second electrode 61B.

In the exemplary embodiment mentioned above, the average value of the thicknesses of the second electrodes 61B may be equal to or smaller than the average value of the thicknesses of the first electrodes 61A. On the other hand, the thickness is preferably set such that the deflection strength of the second electrode 61B is smaller than the deflection strength of the first electrode 61A.

In the exemplary embodiment mentioned above, the configuration related to the third electrode 61C in the first external electrode 61 may be omitted.

In the exemplary embodiment mentioned above, the average value of the particle sizes of the copper particles 63 in the first part 631 of the second electrode 61B may be the equal to, smaller than, or larger than the average value of the particle sizes of the copper particles 63 in the second part 632 of the second electrode 61B.

In the exemplary embodiment mentioned above, the silicon is not limited to the silicone resin 64. For example, the silicon may be silica (silicon dioxide) and the like.

The manufacturing process of the electronic component 10 in the exemplary embodiment mentioned above is not limited to the example of the exemplary embodiment mentioned above. For example, the base body 20 may be subjected to processing such as physical polishing.

In the exemplary embodiment mentioned above, the method for applying the first conductor paste and the second conductor paste is not limited to the example of the exemplary embodiment mentioned above. For example, these pastes may be applied by printing, or may be applied by an inkjet method or the like. In addition, the first conductor paste and the second conductor paste may have different methods.

In the exemplary embodiment mentioned above, the curing step S14 may be performed more than one time. More specifically, the firing may be performed more than one time.

In the exemplary embodiment mentioned above, the sintering onset temperature of the copper component of the second conductor paste and the curing onset temperature of the silicon component thereof are not limited to the example of the exemplary embodiment mentioned above.

<Supplementary Note>

Technical ideas that can be derived from the exemplary embodiments and modification examples mentioned above will be described below.

[1] An electronic component including: a base body; an internal electrode located inside the base body; and an external electrode covering a part of an outer surface of the base body, wherein the external electrode includes a first electrode covering a part of an outer surface of the base body and connected to the internal electrode, and a second electrode covering an outer surface of the first electrode, and the second electrode includes spherical copper particles and silicon, and an average size of the spherical copper particles is different in a first part of the second electrode than in a second part of the spherical electrode.

[2] The electronic component according to [1], wherein when the second electrode is bisected into a first part located on a side closest to the first electrode and a second part located on a side opposite to the first electrode, a proportion of the silicon in the first part is higher than a proportion of the silicon in the second part.

[3] The electronic component according to [1] or [2], wherein an average value of thicknesses of the second electrode is smaller than an average value of thicknesses of the first electrode.

[4] The electronic component according to any one of [1] to [3], wherein, when the first part of the second electrode is located on a side closest to the first electrode and the second part of the second electrode is located on a side opposite to the first electrode, the average size of the spherical copper particles is smaller in the first part of the second electrode than the second part of the second electrode.

[5] The electronic component according to [4], wherein the average size of the spherical copper particles decreases in the second electrode as a distance from the first electrode decreases.

[6] The electronic component according to any one of [1] to [5], wherein a ratio of copper to silicon in the second electrode is 0.5 or more and 2 or less.

[7] The electronic component according to any one of [1] to [6], wherein the silicon includes a silicon resin.

[8] The electronic component according to [7], wherein the silicon resin is distributed in the second electrode as a mesh that fills spaces between the spherical copper particles.

[9] The electronic component according to [7] or [8], wherein at least part of the silicon resin is in lump form.

[10] The electronic component according to any one of [1] to [9], wherein the external electrode includes a third electrode covering an outer surface of the second electrode.

[11] The electronic component according to any one of [1] to [10], wherein the first electrode contains copper and glass.

[12] The electronic component according to any one of [1] to [11], wherein the electronic component is a capacitor.

[13] The electronic component according to any one of [1] to [12], wherein the electronic component is a piezoelectric component.

[14] The electronic component according to any one of [1] to [13], wherein the electronic component is a thermistor.

[15] The electronic component according to any one of [1] to [14], wherein the electronic component is an inductor.

[16] The electronic component according to any one of [1] to [15], wherein the base body includes a dielectric substance.

[17] The electronic component according to any one of [1] to [16], wherein the base body includes a magnetic substance.

[18] The electronic component according to [17], wherein the magnetic substance includes ferrite.

[19] The electronic component according to any one of [1] to [18], wherein the base body includes a composite of synthetic resin and metal.

[20] An electronic component mounting structure including: a board; and an electronic component mounted on the board, wherein the electronic component includes a base body; an internal electrode located inside the base body, and an external electrode covering a part of an outer surface of the base body, the external electrode includes a first electrode covering a part of an outer surface of the base body and connected to the internal electrode, and a second electrode covering an outer surface of the first electrode, the second electrode includes spherical copper particles and silicon, when a surface, of the outer surface of the base body, facing the board is a mounting surface, the first electrode covers at least a part of the mounting surface, and the second electrode covers at least an outer surface of a portion, of the outer surface of the first electrode, covering the mounting surface, and an average size of the spherical copper particles is different in a first part of the second electrode than in a second part of the spherical electrode.

DESCRIPTION OF REFERENCE SYMBOLS

10: Electronic component
20: Base body
41: First internal electrode
61: First external electrode
61A: First electrode
61B: Second electrode
61C: Third electrode
63: Copper particle
64: Silicone resin
631: First part
632: Second part

The invention claimed is:

1. An electronic component, comprising:

a base body;

an internal electrode located inside the base body; and an external electrode covering a part of an outer surface of the base body, wherein the external electrode includes a first electrode covering a part of an outer surface of the base body and connected to the internal electrode, and a second electrode covering an outer surface of the first electrode, the second electrode includes spherical copper particles and silicon, and an average size of the spherical copper particles is different in a first part of the second electrode than in a second part of the spherical electrode.

2. The electronic component according to claim 1, wherein when the first part of the second electrode is located on a side closest to the first electrode and the second part of the second electrode is located on a side opposite to the first electrode, and a proportion of the silicon in the first part is higher than a proportion of the silicon in the second part.

3. The electronic component according to claim 1, wherein an average value of thicknesses of the second electrode is smaller than an average value of thicknesses of the first electrode.

4. The electronic component according to claim 1, wherein, when the first part of the second electrode is located on a side closest to the first electrode and the second part of the second electrode is located on a side opposite the first electrode, the average size of the spherical copper particles is smaller in the first part of the second electrode than the second part of the second electrode.

5. The electronic component according to claim 4, wherein the average size of the spherical copper particles decreases in the second electrode as a distance from the first electrode decreases.

6. The electronic component according to claim 1, wherein a ratio of copper to silicon in the second electrode is 0.5 or more and 2 or less.

7. The electronic component according to claim 1, wherein the silicon includes a silicon resin.

8. The electronic component according to claim 7, wherein the silicon resin is distributed in the second electrode as a mesh that fills spaces between the spherical copper particles.

9. The electronic component according to claim 7, wherein at least part of the silicon resin is in lump form.

10. The electronic component according to claim 1, wherein the external electrode includes a third electrode covering an outer surface of the second electrode.

11. The electronic component according to claim 1, wherein the first electrode includes copper and glass.

12. The electronic component according to claim 1, wherein the electronic component is a capacitor.

13. The electronic component according to claim 1, wherein the electronic component is a piezoelectric component.

14. The electronic component according to claim 1, wherein the electronic component is a thermistor.

15. The electronic component according to claim 1, wherein the electronic component is an inductor.

16. The electronic component according to claim 1, wherein the base body includes a dielectric substance.

17. The electronic component according to claim 1, wherein the base body includes a magnetic substance.

18. The electronic component according to claim 17, wherein the magnetic substance includes ferrite.

19. The electronic component according to claim 1, wherein the base body includes a composite of synthetic resin and metal.

20. An electronic component mounting structure, comprising:

a board; and an electronic component mounted on the board, wherein the electronic component includes a base body, an internal electrode located inside the base body, and an external electrode covering a part of an outer surface of the base body, the external electrode includes a first electrode covering a part of an outer surface of the base body and connected to the internal electrode, and a second electrode covering an outer surface of the first electrode, the second electrode includes spherical copper particles and silicon, when a surface, of the outer surface of the base body, facing the board is a mounting surface, the first electrode covers at least a part of the mounting surface, the second electrode covers at least an outer surface of a portion, of the outer surface of the first electrode, covering the mounting surface, and an average size of the spherical copper particles is different in a first part of the second electrode than in a second part of the spherical electrode.

* * * * *